(12) United States Patent
Best et al.

(10) Patent No.: US 7,092,915 B2
(45) Date of Patent: Aug. 15, 2006

(54) PDA PASSWORD MANAGEMENT TOOL

(75) Inventors: Steven Francis Best, Georgetown, TX (US); Michael Richard Cooper, Austin, TX (US); James Lee Gray, Round Rock, TX (US); Jonathan Mark Wagner, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 10/042,095

(22) Filed: Jan. 7, 2002

(65) Prior Publication Data
US 2003/0130957 A1    Jul. 10, 2003

(51) Int. Cl.
*G06Q 99/00*    (2006.01)
(52) U.S. Cl. ............... 705/67; 713/182; 713/184; 713/185; 713/186; 705/64; 705/31; 705/66
(58) Field of Classification Search ........ 713/200–202, 713/182, 184–186; 705/64–79, 31
See application file for complete search history.

(56) References Cited

U.S. PATENT DOCUMENTS

| 5,764,281 A | 6/1998 | Seo ........................ 348/5.5 |
| 5,812,764 A | 9/1998 | Heinz, Sr. |
| 5,825,413 A | 10/1998 | Mullis ...................... 348/155 |
| 5,953,422 A * | 9/1999 | Angelo et al. ............. 713/185 |
| 5,978,919 A | 11/1999 | Doi et al. .................. 713/202 |
| 6,006,333 A | 12/1999 | Nielsen |
| 6,018,724 A | 1/2000 | Arent ........................ 705/44 |
| 6,072,571 A | 6/2000 | Houlberg ............... 356/139.04 |
| 6,081,893 A | 6/2000 | Grawrock et al. .......... 713/183 |
| 6,088,143 A | 7/2000 | Bang ........................ 359/147 |
| 6,094,721 A | 7/2000 | Eldridge et al. ............ 713/168 |
| 6,101,562 A * | 8/2000 | Chang et al. ................. 710/73 |

(Continued)

FOREIGN PATENT DOCUMENTS

EP    0304891 A2 *    8/1988

OTHER PUBLICATIONS

"Think Outside Announces the First Plug-And-Play Keyboard Soluation for the New HP Jornada 560 PDA Series; Stowaway Keyboard Driver Bundled as Part of teh Included Software", Sep. 6, 2001, Business Wire.*

*Primary Examiner*—Jalatee Worjloh
(74) *Attorney, Agent, or Firm*—Duke W. Yee; Marilyn Smith Dawkins; Gerald H. Glanzman

(57) ABSTRACT

A mechanism is provided for storing user identifications and passwords in a mobile device, such as a personal digital assistant. A modified keyboard device driver may be installed on each platform the user accesses. When the user is prompted for a password from a functioning terminal, the user may select the appropriate account on the mobile device. The mobile device then may send the user identification and password for the account to the terminal. The modified keyboard device driver receives the user identification and password from the mobile device and converts it into keyed text. The accounts with user identifications and passwords may be protected by a password. Thus, the user must only remember the one mobile device password to access a plurality of resources and computer systems. Furthermore, the communications between the mobile device and terminal may be encrypted to prevent snooping.

13 Claims, 4 Drawing Sheets

U.S. PATENT DOCUMENTS

| | | |
|---|---|---|
| 6,141,760 A | 10/2000 | Abadi et al. |
| 6,157,966 A | 12/2000 | Montgomery et al. .......... 710/8 |
| 6,182,229 B1 | 1/2001 | Nielsen ...................... 713/202 |
| 6,192,474 B1 | 2/2001 | Patel et al. ................. 713/171 |
| 6,198,996 B1 | 3/2001 | Berstis ........................ 701/36 |
| 2002/0087890 A1 | 7/2002 | Chan et al. |
| 2002/0147653 A1* | 10/2002 | Shmueli et al. ............... 705/26 |
| 2003/0041251 A1 | 2/2003 | Kumhyr |

* cited by examiner

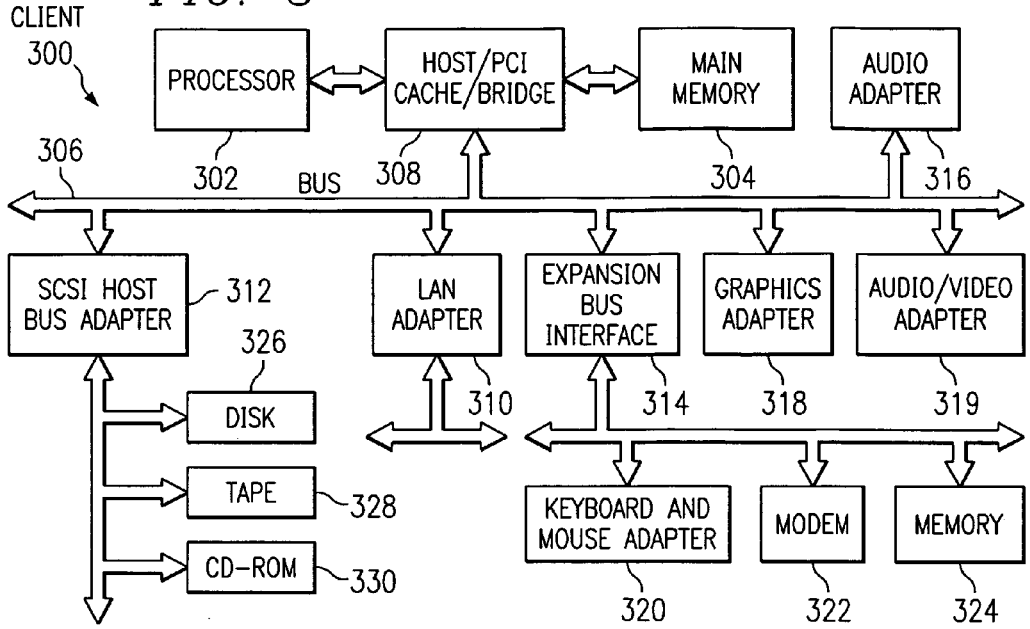
FIG. 3
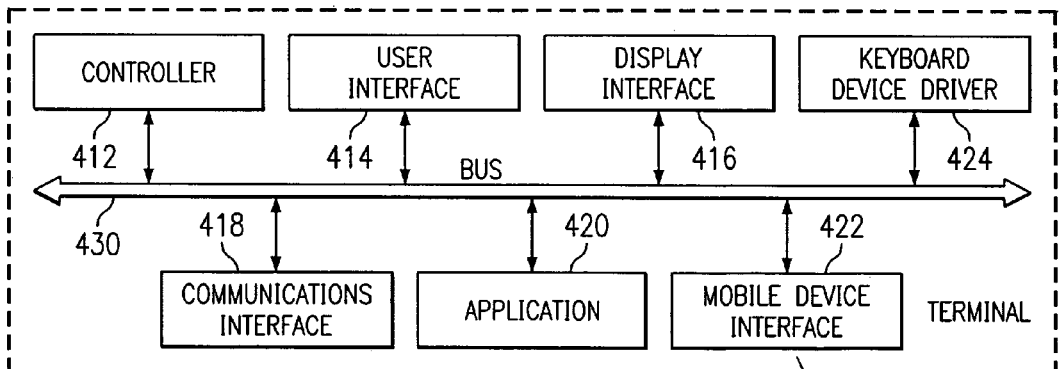
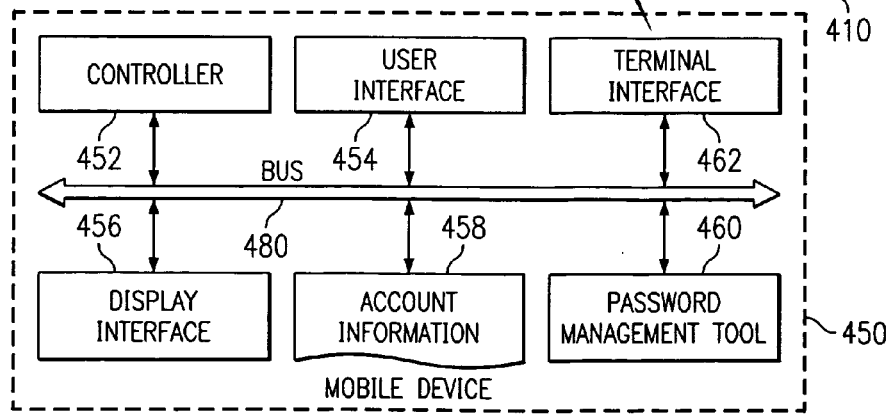
FIG. 4

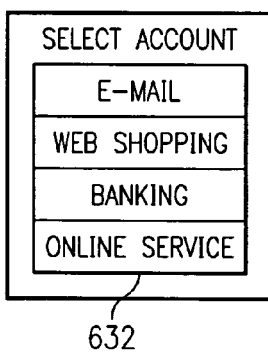
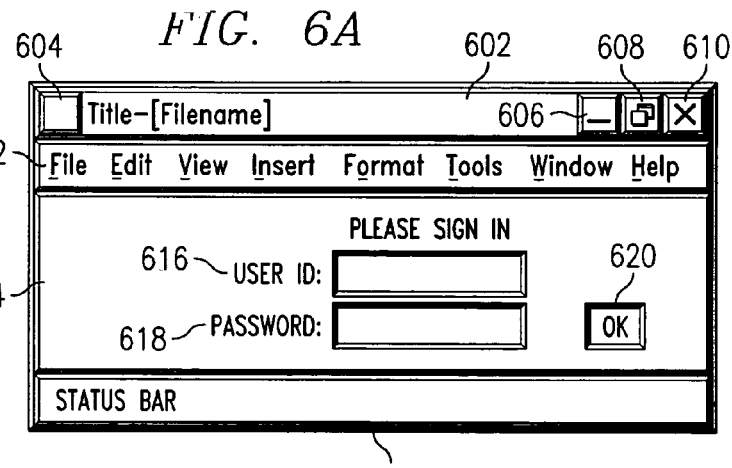
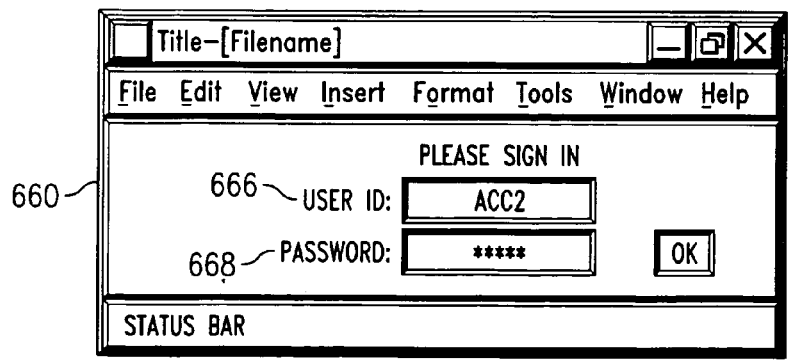

PDA PASSWORD MANAGEMENT TOOL

BACKGROUND OF THE INVENTION

1. Technical Field

The present invention relates to data processing and, in particular, to password management. Still more particularly, the present invention provides a method, apparatus, and program for managing passwords using a mobile device.

2. Description of Related Art

Passwords are necessary but are an inconvenience in current technology. The average person must use identifications (IDs) and passwords to access many resources, including but not limited to personal computer applications, online services, electronic mail, Web sites, and automatic teller machines (ATM). Within a personal computer, a user may require a password to log into the computer or network and access certain protected files or directories. Furthermore, a typical person today uses a plurality of computers, for example a home computer and a work computer. Therefore, the number of user IDs and passwords becomes increasingly difficult to remember.

Some users write down all user IDs and passwords in case they are forgotten. However, this creates a security risk if the paper on which the user IDs and passwords is lost or stolen. Other users simply forget their passwords, placing a burden on support personnel who must answer support calls and repeatedly change passwords for users. One solution is a single sign on system that allows a user to log on with a single user ID and password to access a plurality of resources. However, a single sign on system does not relieve the user of the burden of remembering user IDs and passwords for a plurality of computer systems, e.g., work computer, home computer, television Web appliance, and ATM.

Therefore, it would be advantageous to provide a secure mechanism for managing passwords for multiple resources and computer systems.

SUMMARY OF THE INVENTION

The present invention provides a mechanism for storing user identifications and passwords in a mobile device, such as a personal digital assistant. A modified keyboard device driver may be installed on each platform the user accesses. When the user is prompted for a password from a functioning terminal, the user may select the appropriate account on the mobile device. The mobile device then may send the user identification and password for the account to the terminal. The modified keyboard device driver receives the user identification and password from the mobile device and converts it into keyed text. The accounts with user identifications and passwords may be protected by a password. Thus, the user must only remember the one mobile device password to access a plurality of resources and computer systems. Furthermore, the communications between the mobile device and terminal may be encrypted to prevent snooping.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a data processing system in which the present invention may be implemented;

FIG. 4 is a block diagram illustrating a password management system in accordance with a preferred embodiment of the present invention;

FIG. 5 is an example account information data structure in accordance with a preferred embodiment of the present invention;

FIGS. 6A–6C are example screens of display for a password management system in accordance with a preferred embodiment of the present invention;

DETAILED DESCRIPTION OF THE PREFERRED EMBODIMENT

Figure 1:
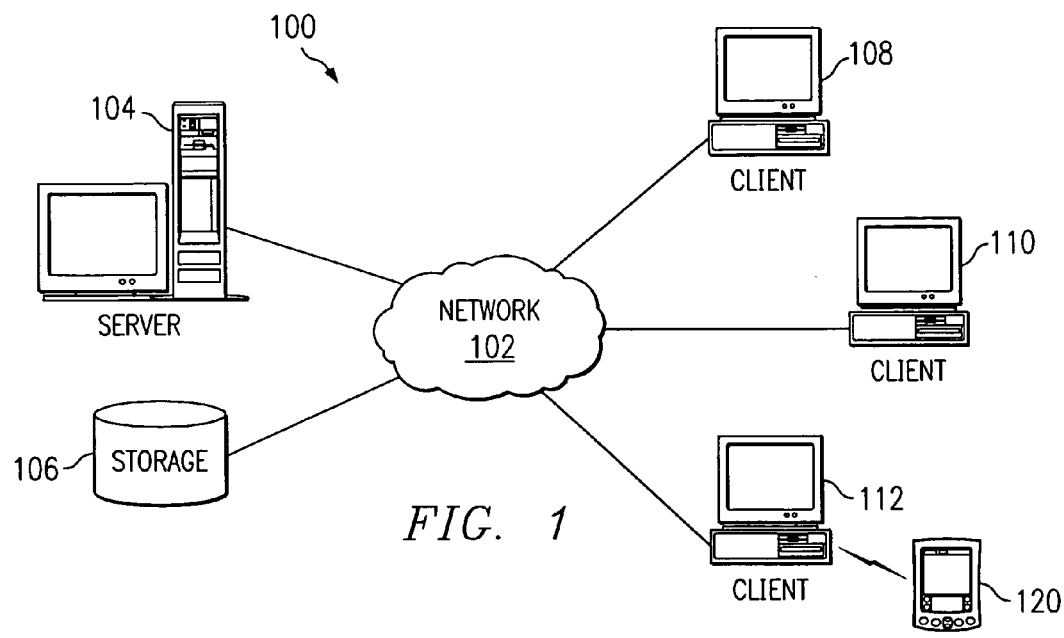
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Clients 108, 110, 112 may provide access to resources, such as files, directories, databases, and applications. The clients may also provide access to resources on the network, such as server 104. For example, server 104 may be for example an e-mail, newsgroup, or Web server.

In accordance with a preferred embodiment of the present invention, user identifications and passwords are stored in mobile device 120. Mobile device 120 may be, for example, a handheld computer, personal digital assistant (PDA), or telephony device. A modified keyboard device driver may be installed on clients, such as client 112. When the user is prompted for a password from client 112, the user may select the appropriate account on mobile device 120. The mobile device then may send the user identification and password for the account to client 112.

The modified keyboard device driver receives the user ID and password from mobile device 120 and converts it into keyed text. The accounts with user IDs and passwords may be protected by a password. Thus, the user must only remember the one mobile device password to access a plurality of resources and computer systems. Furthermore, the communications between the mobile device and terminal may be encrypted to prevent snooping.

Figure 2:
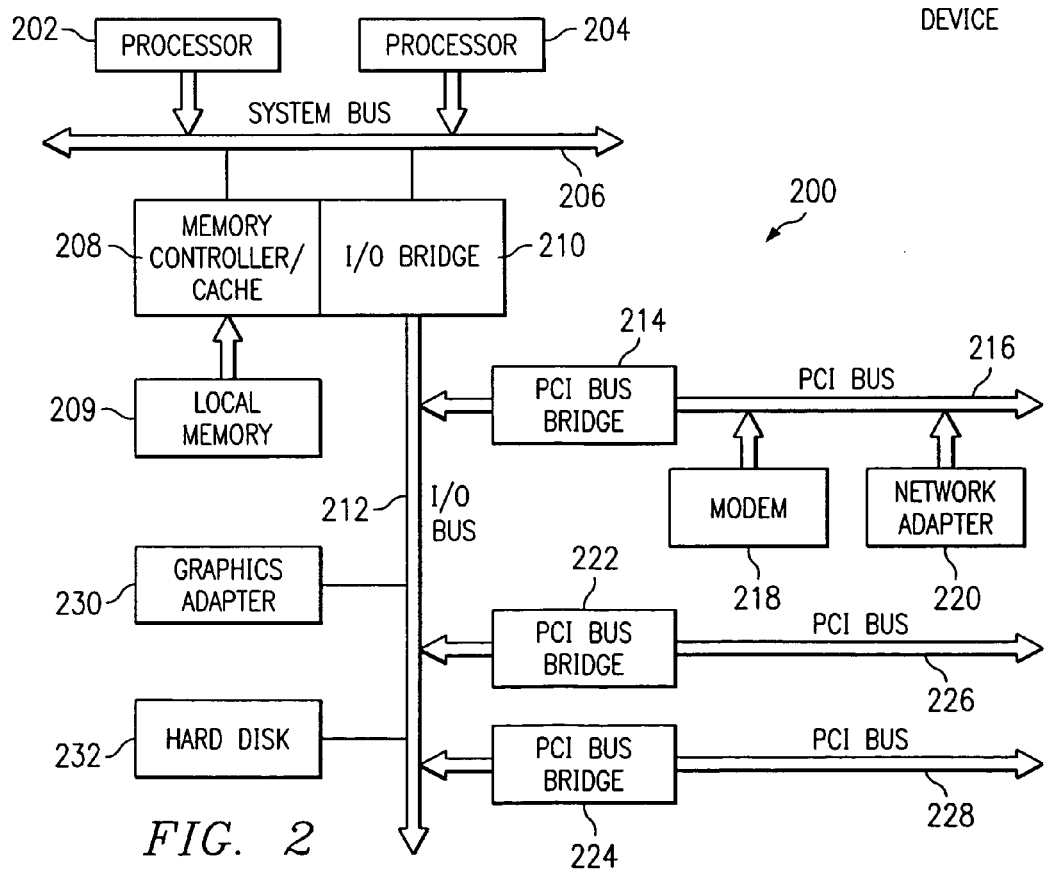
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. The depicted example in FIG. 3 and above-described examples are not meant to imply architectural limitations. For example, data processing system 300 also may be a notebook computer or hand held computer. Data processing system 300 also may be a kiosk or a Web appliance.

With reference now to FIG. 4, a block diagram is shown illustrating a password management system in accordance with a preferred embodiment of the present invention. The password management system includes terminal 410 and mobile device 450. Terminal 410 may be any device a user may wish to access. For example, the terminal may be a personal computer, a network computer, a notebook computer, a television Web appliance, an automatic teller machine, or a kiosk. Mobile device 450 may be any mobile device a user may use to store information. For example, the mobile device may be a PDA, a handheld computer, or a telephony device.

Terminal 410 includes a controller 412, a user interface 414, a display interface 416, a communications interface 418, an application 420, a mobile device interface 422, and keyboard device driver 424. The elements 412–424 may be implemented as hardware, software, or a combination of hardware and software. In a preferred embodiment, the elements 422–424 are implemented as software instructions executed by one or more processors.

The elements 412–424 are coupled to one another via the control/data signal bus 430. Although a bus architecture is shown for the terminal in FIG. 4, the present invention is not limited to such. Rather, any architecture that facilitates the communication of control/data signals between elements 422–424 may be used without departing from the spirit and scope of the present invention. The controller 412 controls the overall operation of the terminal and orchestrates the operation of the other elements 414–424.

With the operation of the present invention, an application 420 may instruct controller 412 to prompt the user for a user ID and/or password via display interface 416. Application 420 may be controlling access to a resource on terminal 410 or to a remote resource through communications interface 418. A user may enter the user ID and/or password via user interface 414.

Mobile device 450 includes a controller 452, a user interface 454, a display interface 456, account information 458, password management tool 460, and terminal interface 462. The elements 452–462 may be implemented as hardware, software, or a combination of hardware and software. In a preferred embodiment, the elements 452–462 are implemented as software instructions executed by one or more processors.

The elements 452–462 are coupled to one another via the control/data signal bus 480. Although a bus architecture is shown for the mobile device in FIG. 4, the present invention is not limited to such. Rather, any architecture that facilitates the communication of control/data signals between elements 452–462 may be used without departing from the spirit and scope of the present invention. The controller 452 controls the overall operation of the mobile device and orchestrates the operation of the other elements 454–462.

With the operation of the present invention, password management tool 460 instructs controller 452 to receive user IDs and passwords from the user via user interface 454 and store the user IDs and passwords into account information 458. Password management tool 460 also instructs controller 452 to receive a selection of an account from the user via user interface 454 and to transmit the selected user ID and password to the terminal using terminal interface 462.

Keyboard device driver 424 in terminal 410 may replace the existing keyboard driver or may be supplemental to the existing keyboard driver. Hence, the keyboard device driver may be configured to receive user input via a keyboard or to receive mobile input via mobile device interface 422. The keyboard device driver then receives the transmitted information via mobile device interface 422 and converts the received mobile input information into keyed text. The keyed text may then be provided to application 420 to gain access to the resource as if the information was received via a keyboard device.

Mobile device interface 422 and terminal interface 462 may be wired or wireless communications interfaces. For example, the mobile device may be connected to the terminal through a parallel, serial, or Universal Serial Bus (USB) connection. The mobile device may also communicate with the terminal using wireless communications mediums, such as for example radio frequency (RF) or infrared (IR). In a preferred embodiment, mobile device interface 422 and terminal interface 462 are infrared interfaces. The mobile device interface and the terminal interface may communicate in accordance with the Infrared Data Association (IrDA) Serial Data Link Standard Specification. Alternatively, mobile device interface 422 may be a wireless keyboard interface and the wireless keyboard device driver may be modified to receive input from the wireless keyboard and a mobile device.

Furthermore, mobile device interface 422 and terminal interface 462 may encrypt transmitted data and decrypt received data to protect the information from being intercepted. If transmitted data is encrypted, modified keyboard device driver 424 must also be configured to decrypt information received from the mobile device.

Password management tool 460 may also require user authentication to access account information 458. For example, the user may be required to supply a user ID and/or password via user interface 454. Password management tool 460 may also encrypt account information 458 and require a key, such as a password, smart card, etc., to access the information.

As an example, mobile device interface 422 may be an adapter that is configured to connect between a keyboard connector and the keyboard port. The mobile device interface 422 may then receive input from a mobile device and insert the mobile input into the data stream from the keyboard. Keyboard device driver 424 may then be modified device driver that takes the place of the default keyboard device driver. The keyboard device driver may then to receive the mobile input as if it is keyed text. The keyboard device driver may also be configured to perform other processing, such as decryption, and conversion format one from to another format to be consistent with keyboard input.

As another example, mobile device interface 422 may be a separate interface. For example, the mobile device interface may connect to a serial port. In this example, keyboard device driver 424 may be supplemental to an existing keyboard device driver. Keyboard device driver 424 may also be a daemon program that runs in the background. Keyboard device driver 424 may then receive mobile input, convert the mobile input to keyboard input, and insert the converted mobile input into the system input queue. To application 420, the mobile input will appear as keyed input. Thus, the user may place a cursor into a password field and send verification information as keyed text to the password field using the mobile device.

Turning now to FIG. 5, an example account information data structure is shown in accordance with a preferred embodiment of the present invention. Account information data structure 500 associates a resource 502 with an account ID 504 and a password 506. For example, a user may enter information for an e-mail account, wherein the information includes an account ID of "acc1" and a password of "pass1." The user may also enter an account ID of "acc2" and a password of "pass2" for a Web shopping site, an account ID of "acc3" and a password of "pass3" for a banking account, and an account ID of "acc4" and a password of "pass4" for an online service.

Example screens of display for a password management system are shown in FIGS. 6A–6C in accordance with a preferred embodiment of the present invention. Particularly, with reference to FIG. 6A, a screen comprises a login window 600, including a title bar 602, which may display the name of the application program. Title bar 602 also includes a control box 604, which produces a drop-down menu (not shown) when selected with the mouse, and "minimize" 606, "maximize" or "restore" 608, and "close" 610 buttons. The "minimize" and "maximize" or "restore" buttons 606 and 608 determine the manner in which the program window is displayed. In this example, the "close" button 610 produces an "exit" command when selected. The drop-down menu produced by selecting control box 604 includes commands corresponding to "minimize," "maximize" or "restore," and "close" buttons, as well as "move" and "resize" commands.

The login window 600 also includes a menu bar 612. Menus to be selected from menu bar 612 may include "File," "Edit," "View," "Insert," "Format," "Tools," "Window," and "Help." However, menu bar 612 may include fewer or more menus, as understood by a person of ordinary skill in the art. The login window also includes display area 614 in which a user ID field 616 and password field 618 are displayed. Display area 614 also includes button 620, which may be selected to submit the user ID and password information for authentication. Turning to FIG. 6B, mobile device window 630 presents a list 632 of accounts for selection by a user. When a user selects one of the accounts, such as by selecting the "Web Shopping" button, the mobile device transmits the appropriate user ID and password to the terminal.

Next, with reference to FIG. 6C, login window 660 presents user ID field 666 and password field 668. The terminal receives the user ID and password from the mobile device and converts the information to keyed text. The terminal may then map the keyed text to the appropriate fields. Thus, the user ID is placed in user ID field 666 and the password is placed in password field 668 as if they were keyed in by the user.

Figure 7:
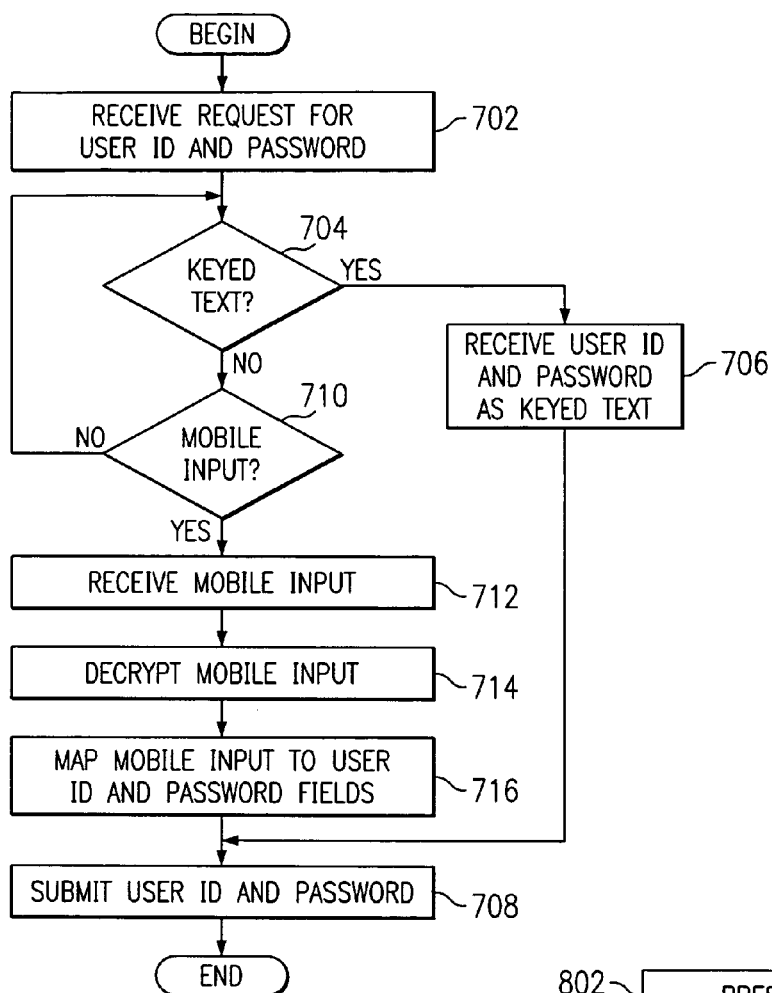
FIG. 7 is a flowchart illustrating the operation of a terminal in accordance with a preferred embodiment of the present invention.

With reference to FIG. 7, a flowchart is shown illustrating the operation of a terminal in accordance with a preferred embodiment of the present invention. The process begins and receives a request for a user ID and password to access a resource (step 702). A determination is made as to whether keyed text is received (step 704). If keyed text is received, the process receives the user ID and password as keyed text (step 706), submits the user ID and password to gain access to the resource (step 708), and ends.

If keyed text is not received in step 704, a determination is made as to whether mobile input is received (step 710). If input from a mobile device is not received, the process returns to step 704 to determine whether keyed text is received. If input from a mobile device is received in step 710, the process receives the mobile input (step 712), decrypts the mobile input (step 714), and maps the mobile input to user ID and password fields (step 716). Thereafter, the process submits the user ID and password to gain access to the resource (step 708) and ends.

Figure 8:
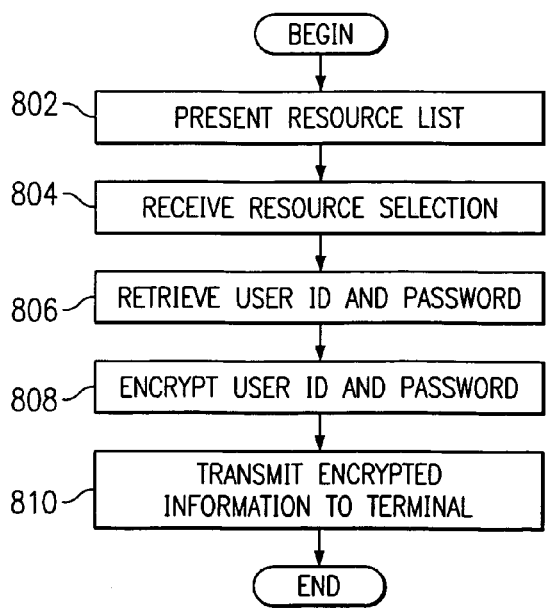
FIG. 8 is a flowchart illustrating the operation of a mobile device in accordance with a preferred embodiment of the present invention.

With reference now to FIG. 8, a flowchart illustrating the operation of a mobile device is shown in accordance with a preferred embodiment of the present invention. The process begins and presents a resource or account list (step 802). The process then receives a resource selection (step 804) and retrieves a corresponding user ID and password (step 806). Next, the process encrypts the user ID and password (step 808), transmits the encrypted information to the terminal (step 810), and ends.

Thus, the present invention solves the disadvantages of the prior art by providing a password management tool that allows a user to manage a plurality of passwords at a single point of reference. Thus, a user may access a plurality of resources and a plurality of computer systems using a single mobile device. The accounts with user identifications and passwords may be protected in the device by a password. Thus, the user must only remember the one mobile device password to access a plurality of resources and computer systems. Furthermore, the communications between the mobile device and terminal may be encrypted to prevent snooping.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for authenticating a user, comprising:
   presenting at least one authentication information field for accessing a terminal;
   receiving mobile input including authentication information from a mobile device, wherein a keyboard device driver on the terminal is configured to receive user input from a keyboard and to receive the mobile input from a mobile device interface, and wherein the mobile input is encrypted;
   converting the mobile input to keyboard input, wherein the keyboard device driver decrypts the mobile input; and
   entering the keyboard input into the at least one authentication information field to access the terminal.

2. The method of claim 1, wherein the mobile device is one of a personal digital assistant, a handheld computer, and a telephony device.

3. The method of claim 1, wherein the method is performed by a terminal.

4. The method of claim 3, wherein the terminal is one of a personal computer, a network computer, a notebook computer, a television Web appliance, an automatic teller machine, and a kiosk.

5. The method of claim 1, wherein the at least one authentication information field comprises a user identification field and a password field.

6. The method of claim 5, wherein the step of entering the authentication information into the at least one authentication information field comprises:
   identifying a user identification and a password in the authentication information; and
   mapping the user identification to the user identification field and the password to the password field.

7. A terminal for authenticating a user, comprising:
   a display interface;

a mobile device interface; and a controller, coupled to the display interface and the mobile interface, wherein the controller presents at least one authentication information field for accessing the terminal; receives mobile input including authentication information from a mobile device, wherein a keyboard device driver on the terminal is configured to receive user input from a keyboard and to receive the mobile input from a mobile device interface, and wherein the mobile input is encrypted; converts the mobile input to keyboard inputs, wherein the keyboard device driver decrypts the mobile input; and enters the keyboard input into the at least one authentication information field to access the terminal.

8. The terminal of claim 7, wherein the mobile device interface communicates with a mobile device.

9. The terminal of claim 7, wherein the mobile device interface comprises an infrared interface.

10. The terminal of claim 7, wherein the terminal is one of a personal computer, a network computer, a notebook computer, a television Web appliance, an automatic teller machine, and a kiosk.

11. The terminal of claim 7, wherein the at least one authentication information field comprises a user identification field and a password field.

12. The terminal of claim 11, wherein the controller identifies a user identification and a password in the authentication information and maps the user identification to the user identification field and the password to the password field.

13. A computer program product, in a computer readable medium, for authenticating a user, comprising:

instructions for presenting at least one authentication information field for accessing a terminal;

instructions for receiving mobile input including authentication information from a mobile device, wherein a keyboard device driver on the terminal is configured to receive user input from a keyboard and to receive the mobile input from a mobile device interface, and wherein the mobile input is encrypted;

instructions for converting the mobile input to keyboard input, wherein the keyboard device driver decrypts the mobile input; and instructions for entering the keyboard input into the at least one authentication information field to access the terminal.

* * * * *